United States Patent
Kolmonen

(12) 
(10) Patent No.: US 6,308,081 B1
(45) Date of Patent: Oct. 23, 2001

(54) TRANSMISSION METHOD AND RADIO SYSTEM

(75) Inventor: Juha Kolmonen, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/566,271

(22) Filed: May 5, 2000

Related U.S. Application Data

(63) Continuation of application No. PCT/FI99/00721, filed on Sep. 6, 1999.

(30) Foreign Application Priority Data

Sep. 9, 1998 (FI) .......................................... 981934

(51) Int. Cl.$^7$ ................. H04Q 7/20; H04J 3/00; H04B 17/00
(52) U.S. Cl. .................. 455/522; 455/67.1; 455/517; 370/528
(58) Field of Search .................. 455/67.1, 78, 127, 455/70, 522, 517, 343; 370/535, 287, 433, 528

(56) References Cited

U.S. PATENT DOCUMENTS

| | | | |
|---|---|---|---|
| 4,093,823 | * | 6/1978 | Chu ...................................... 370/535 |
| 5,212,823 | * | 5/1993 | Fujii et al. ........................... 455/522 |
| 5,239,557 | * | 8/1993 | Dent .................................... 370/342 |
| 5,784,411 | * | 7/1998 | Willey ................................. 375/368 |
| 5,793,744 | * | 8/1998 | Kanerva et al. ..................... 370/209 |
| 5,835,486 | * | 11/1998 | Davis et al. ......................... 370/287 |
| 5,835,889 | * | 11/1998 | Kapanen ............................. 704/215 |
| 5,839,056 | * | 11/1998 | Hakkinen ............................. 455/69 |
| 6,035,179 | * | 3/2000 | Virtanen ................................ 455/63 |
| 6,038,238 | * | 3/2000 | Jokinen et al. ...................... 370/523 |
| 6,097,772 | * | 8/2000 | Johnson et al. ..................... 375/346 |
| 6,104,992 | * | 8/2000 | Gao et al. ............................ 704/220 |

FOREIGN PATENT DOCUMENTS

| | | |
|---|---|---|
| 2 332 598 | 6/1999 | (GB) . |
| WO 96/28809 | 9/1996 | (WO) . |
| WO 98/36508 | 8/1998 | (WO) . |
| WO 98/57509 | 12/1998 | (WO) . |
| WO 99/10995 | 3/1999 | (WO) . |

OTHER PUBLICATIONS

Sherman, Data Communications A User's Guide, 3rd. Edition 1990, pp. 243–248.*
Copy of International Search Report for PCT/FI99/00721.

* cited by examiner

*Primary Examiner*—Vivian Chang
*Assistant Examiner*—Charles N. Appiah
(74) *Attorney, Agent, or Firm*—Altera Law Group, LL

(57) ABSTRACT

The invention relates to a transmission method and a radio system comprising a base transceiver station acting as a transceiver and subscriber terminals acting as transceivers which establish a connection with each other with a signal transmitted through the base transceiver station, for which connection a radio channel is formed, in which a signal coded by the transceiver is transmitted. The transceiver comprises transmission means which transmit frames when the transceiver is in DTX mode. The radio system comprises measuring means which measure the signal received by the transceiver from the radio channel, and transmission means which during DTX transmit information in frames on the basis of the measurement result obtained from the measuring means, of which frames at least some are freely placed by the transmission means anywhere in the frame structure to be transmitted. The transmission means transmit the frames to a transceiver, which is connected to a transceiver in DTX mode, and the transceiver receiving the frames alters its operation on the basis of the information in the frames.

25 Claims, 2 Drawing Sheets

TRANSMISSION METHOD AND RADIO SYSTEM

This application is a continuation of international application Ser. No. PCT/FI99/00721, filed Sep. 6, 1999.

FIELD OF THE INVENTION

The invention relates to a transmission method used during DTX in a radio system comprising a base transceiver station acting as a transceiver and subscriber terminals acting as transceivers which establish a connection with each other with a signal transmitted through the base transceiver station, for which connection a radio channel is formed, in which a signal coded by the transceiver is transmitted.

BACKGROUND OF THE INVENTION

In a cellular radio system, discontinuous transmission, or DTX, is used to reduce interference and the power consumption of a subscriber terminal. The above-mentioned cellular radio system can be a GSM system, for instance. DTX is used during breaks in speech. During DTX, the subscriber terminal usually only transmits a silence descriptor frame, i.e. SID frame. A SID frame is normally transmitted once every 480 ms.

A SID frame is typically used to generate noise in a subscriber terminal in DTX mode. If a noise of suitable magnitude was not generated, the receiver would find the silence caused by breaks uncomfortable. In the worst case, the receiver would think that the connection has been broken. During breaks in speech, the coder enters DTX mode during which SID frames are transmitted. The SID frames transmitted during breaks in speech comprise various update data. The receiver uses the update data when generating noise, for instance. The SID frames are also used to measure the quality of the radio channel. If SID frames are used in a GSM system, for instance, the measurement period is 480 ms.

A transceiver of a radio system can in some cases very quickly need information on the changes taking place in the radio channel. This means that apparatuses in radio systems must receive updated information on the status of the data and radio channel at a fast pace. An apparatus of the kind mentioned above is for instance an AMR transceiver (AMR=Adaptive Multirate) which requires a fast adaptation rate. In addition, radio systems need to transmit data concerning the channel mode of a speech codec, for instance.

In current radio systems, a transmitter can transmit the above-mentioned data during DTX only in predefined TDMA frame locations. TDMA frame locations are the same frame locations in which information on the background noise during breaks in speech is also transmitted. Prior art systems are relatively inflexible, because they use fixed transmission periods for transmitting the above information.

Radio systems thus need to transmit control commands as often as possible to a coder and decoder concerning the AMR mode, for instance. The problem with prior art radio systems is the slow rate of adaptation. Adaptation could be accelerated by blocking DTX in both transmission and reception directions, for instance. This way, control information could be transmitted in each frame. The above-mentioned method would, however, lead to loosing at least a part of the benefit derived from DTX. In practice, loosing benefit means that the battery operation time would not be extended. The amount of interference would also probably increase.

Another problem is the slow transmission rate of the control data required by the AMR codec. As mentioned earlier, for optimum operation, the AMR codec requires information on the status of the channel and the codec mode, for instance. However, the transmission of the above-mentioned data takes relatively long in prior art systems. The slowness of the transmission has resulted in not getting the best possible benefit out of the AMR in DTX mode.

BRIEF DESCRIPTION OF THE INVENTION

It is thus an object of the invention to implement a transmission method and a radio system so as to solve the above-mentioned problems. This is achieved by the type of transmission method disclosed in the preamble, characterized by measuring a signal received from a radio channel, transmitting during DTX frames placed in a frame structure to the radio channel on the basis of the received measurement result, freely placing at least some of the frames anywhere in the frame structure to be transmitted, transmitting information in the frames to a transceiver which communicates with a transceiver in DTX mode, and altering the operation of the transceiver, which receives the above-mentioned frames, on the basis of the information in the frames.

A further object of the invention is a radio system comprising a base transceiver station acting as a transceiver and subscriber terminals acting as transceivers which establish a connection with each other with a signal transmitted through the base transceiver station, for which connection a radio channel is formed, in which a signal coded by the transceiver is transmitted, and in which radio system the transceiver comprises transmission means which transmit frames when the transceiver is in DTX mode.

The radio system of the invention is characterized in that it comprises measuring means which measure the signal received by the transceiver from the radio channel, and transmission means which during DTX transmit information on frames to the radio channel on the basis of the measurement results received from the measuring means, of which frames at least some are freely placed by the transmission means in the frame structure to be transmitted, after which the transmission means transmit the frames to the transceiver which is connected to a transceiver in DTX mode, and the transceiver receiving the frames alters its operation on the basis of the information in the frames.

The preferred embodiments of the invention are set forth in the dependent claims.

The invention is based on the idea that a transceiver in DTX mode uses an optimum quantity of fixed frames per measurement period in measuring a radio channel. If the fixed frames are SID frames, for instance, the unused SID frames can be transmitted when necessary. The transmission of SID frames is thus not in any way bound to the frame structure used.

The transmission method and radio system of the invention provide several advantages. A transceiver in DTX mode receives during a measurement period preferably only one fixed SID frame which is used for measuring the quality of the radio channel. In the method, preferably a maximum of one fixed SID frame is used in an SACCH multiframe. Other SID frames can be transmitted when necessary. This way, the method becomes more flexible. The above-mentioned frame does not, however, necessarily have to be a SID frame, but it can be any other frame containing control and measurement data.

Since SID frames can also be transmitted when necessary, control data can be quickly transmitted to for instance an AMR codec, which makes it possible for the codec to quickly adapt to the signal. Extra SID update frames are only transmitted when the changes in the radio channel are extensive enough. Thus, the average benefit derived from DTX remains good all the time. The method enables transmitting SID frames, channel control data and measurement data at a very fast pace.

BRIEF DESCRIPTION OF THE DRAWINGS

In the following, the invention will be described in greater detail in connection with preferred embodiments and with reference to the attached drawings in which.

DETAILED DESCRIPTION OF THE INVENTION

Figure 1:
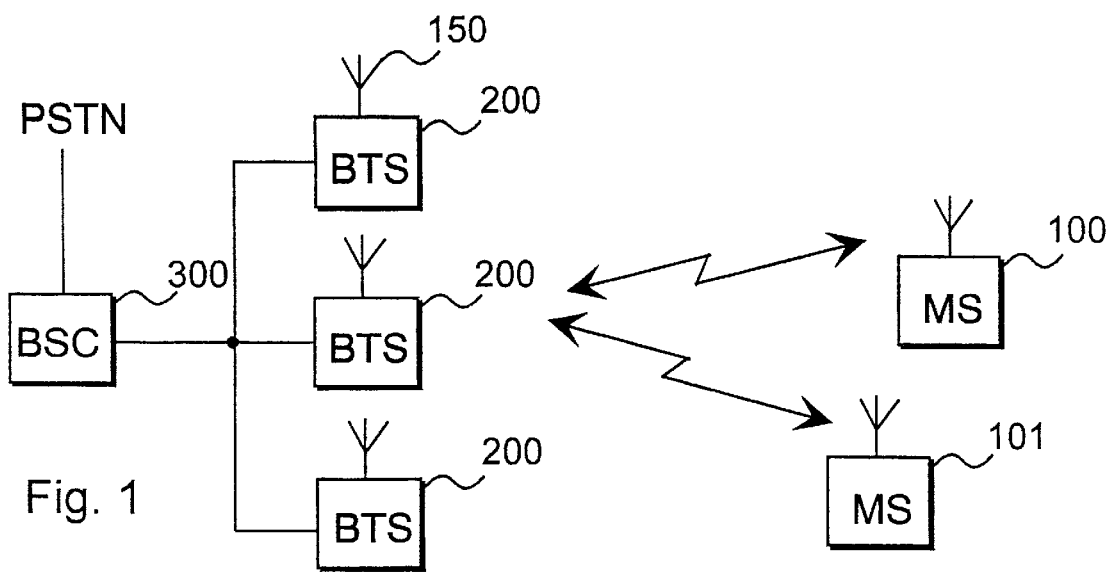
FIG. 1 shows a radio system which uses the method of the invention.

FIG. 1 shows a cellular radio system which uses the method of the invention. The presented cellular radio system comprises a base station controller 300, base transceiver stations 200 and a set of subscriber terminals 100, 101. The base transceiver stations 200 and subscriber terminals act as transceivers in the cellular radio system. The subscriber terminals establish a connection to each other by means of signals propagated through the base transceiver station 200. A subscriber terminal 100 can be a mobile phone, for instance. The radio system presented in FIG. 1 can for instance be a GSM, CDMA or UMTS system or a radio system defined in guideline IS95. The TDMA multiple access method, for instance, can be used in the radio system.

Figure 2:
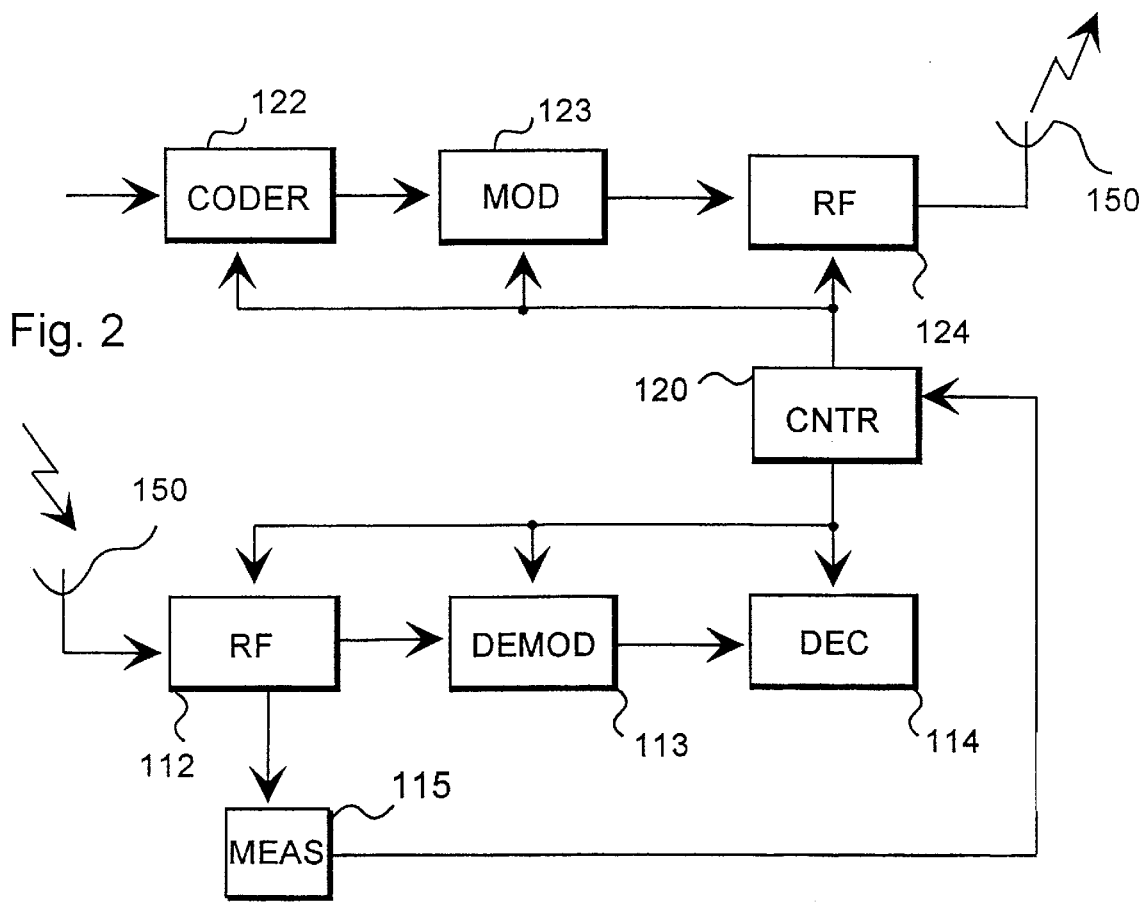
FIG. 2 shows the structure of a transceiver used in a radio system of the invention in principle.

FIG. 2 shows the structure of a transceiver used in a radio system of the invention in principle. The transceiver presented in FIG. 2 can either be a subscriber terminal 100 or a base transceiver station 200. The transceiver comprises an antenna 150 which in practice functions as a transceiver antenna. Additionally, the transceiver comprises radio frequency parts 112, 124, a modulator 123, a demodulator 113 and a control block 120. The radio frequency parts 112 function in practice as signal reception means. The radio frequency parts 124 function in practice as signal transmission means.

Further, the transceiver comprises a coder 122 and a decoder 114. The radio frequency parts 112 transform the radio frequency signal coming from the antenna to an intermediate frequency. The intermediate frequency signal is forwarded to the demodulator 113 which demodulates the signal. After this, the demodulated signal is decoded in the decoder 114. The decoder for instance decrypts and channel-decodes the signal. The task of the control block 120 of the transceiver is to control the functions of the above-mentioned transceiver blocks.

Coder 122 receives the signal and transmits the signal it has coded to the modulator 123. The coder 122 uses convolution coding, for instance, in the coding. In addition, the coder 122 for instance encrypts and channel-codes the signal. Further, the coder 122 interleaves the bits or bit groups in the signal. After this, the convolution-coded signal is forwarded to the modulator 123 which modulates the signal. After this, the signal is forwarded to the transmission means 124 which convert the modulated signal into radio frequency format. The transmission means transmit the modulated signal by means of the antenna to the radio path.

Let us assume that, for optimum operation, the coder 122 and decoder 114 residing in the transceiver of the radio system require information on the changes occurring in the radio channel very quickly. In the above situation, the information on the status of the radio channel must be updated at a fast pace. The transceiver comprises measuring means 115 measuring the radio channel and the measurement data obtained from them are forwarded on to the coder and decoder. For instance, an AMR transceiver (AMR= Adaptive Multirate) comprises a coder 122 and decoder 114 which require a fast adaptation rate. In practice, this means that the coder 122 and decoder 114 occasionally very quickly need information on the changes occurred in the radio channel. If the radio channel weakens quickly, information on the weakening must be transmitted as quickly as possible from the transceiver receiving the signal to the transceiver transmitting the signal.

By means of the measuring means 115, a transceiver in DTX mode measures the radio channel from the signal it has received. A transceiver in DTX mode transmits information on the radio channel on the basis of the measurement it has performed and the transceiver receiving the information can for instance change the coding parameters it uses. The radio channel status information measured by the measuring means 115 can for instance be based on the level, power, signal-to-noise ratio or bit error ratio of the received signal. The measuring means 115 can for instance be located in a subscriber terminal, in which case the subscriber terminal in DTX mode transmits control data in SID frames to the base transceiver station 200. The base transceiver station can also transmit corresponding control data to the subscriber terminal. Even though the operation of the invention is in the following described from the perspective of SID frames, the frames need necessarily not be SID frames, but instead of SID frames any frames containing control and measurement data can be used.

In practice, changing the coding parameters means that the transceiver alters the coding rate of its coder and/or decoder. The coder 122 and decoder 114 can alter their coding rate so that when the coding rate of the speech coder increases, the coding rate of the channel coder decreases. In practice, the coder 122 and decoder 114 have a set of predefined standard coding rates which are, when necessary, altered according to the information in the SID frames. SID frames are transmitted when the transceiver is in DTX mode. The transmission means 124 of the transceiver are capable of transmitting data in SID frames when necessary. This means that the transmission frequency of the SID frames can be increased or decreased on the basis of the measurement data obtained from the measuring of the radio channel. In the transmission method of the invention, the transmission means 124 preferably transmit only one SID frame, which has a fixed, predefined frame location in the SACCH frame structure. The transmission means 124 are, however, capable of transmitting SID update frames when necessary, in which case information on changes occurring in the radio channel can quickly be transmitted to the transceiver at the other end of the connection.

On the basis of the information transmitted in the SID frames, the control means 120 can update the coding parameters of the coder 122 acting as a speech coder. Updating the coding parameters alters the coding rate of speech. The decoding rate used by the decoder 114 can be updated in the same way. Further, the coding parameters of the coder acting as a channel coder can be updated, which alters the channel coding rate of the channel coder. The decoding rate of the channel decoder can also be altered by means of control signals received by the transceiver.

The coding rates of a coder 122 and a decoder 114 acting as a speech coder can typically vary from 4.5 to 13 kbit/s. The coding rate of a coder acting as a channel coder can typically vary from 9 to 17.5 kbit/s, when the channel coder operates at full speed. The speed of a signal coded by a channel coder is between 0 to 6.5 kbit/s, when the channel coder operates at half speed.

Before receiving a control signal, the speech coder can have coded at a rate of 4.5 kbit/s, for instance, and the channel coder can have coded at a rate of 17.5 kbit/s, for instance. After the update of the coding parameters, the speech coder can code at a rate of 13 kbit/s, for instance, and the channel coder at a rate of 9 kbit/s, for instance. Due to updates during DTX, a coder and decoder can adapt faster to the signal being coded or decoded, because the coder and decoder can be set in a predefined optimum operation mode. An increase in the speech coding rate decreases the channel coding rate used. An increase in the channel coding rate decreases the speech coding rate used.

Figure 3:
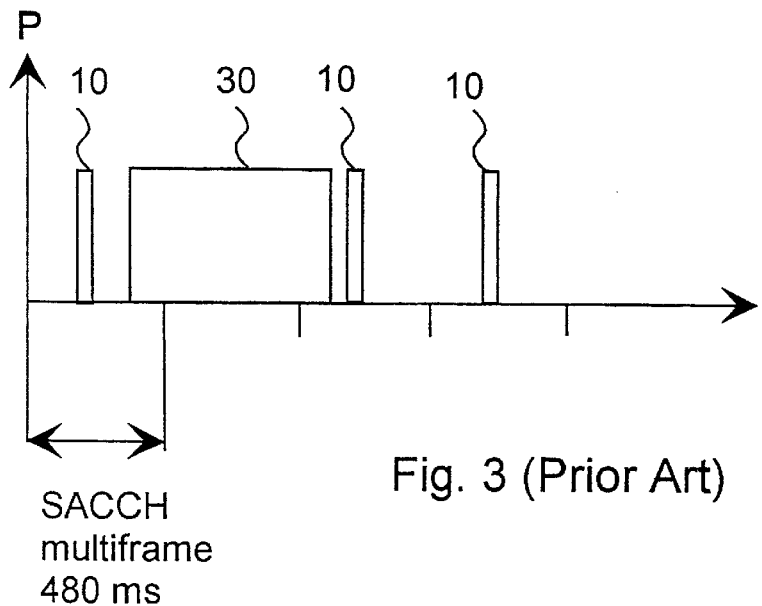
FIG. 3 shows a signal transmitted by a transceiver in a prior art radio system.

FIG. 3 shows a signal, which is in an SACCH frame structure, transmitted by a transceiver in a prior art radio system. The signal presented in the figure can be sent by a base transceiver station, for instance, to a mobile phone. The signal comprises SID frames 10 and speech frames 30. The figure shows that in a prior art radio system SID frames are transmitted only once in an SACCH multiframe during DTX. Additionally, the location of the SID frames is fixed in the frame structure, which has resulted in that it has not been possible to transmit information on the changes occurred in the radio channel onward as quickly as required.

Figure 4:
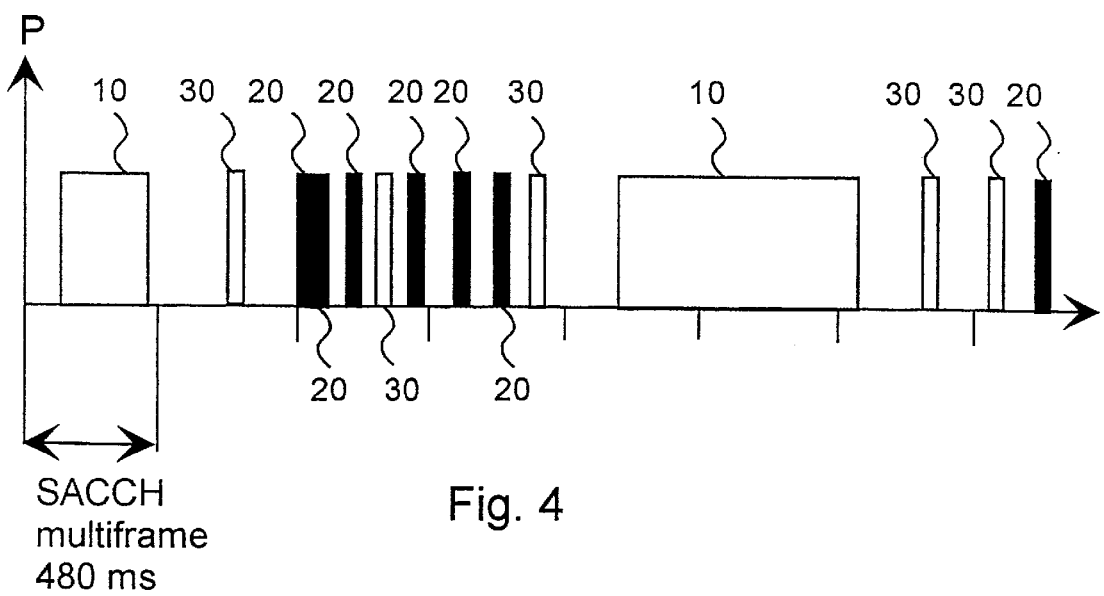
FIG. 4 shows a signal transmitted by a transceiver in a radio system of the invention.

FIG. 4 shows a signal, which is in an SACCH frame structure, transmitted by a transceiver in a radio system of the invention. The signal presented in the figure comprises speech frames 10, in which speech or a data signal is transmitted, and SID frames 30. In addition, the signal presented in FIG. 4 comprises SID frames 20, by means of which the information obtained from measuring the radio channel are updated. The figure shows that the update frames can sometimes be transmitted fairly frequently during DTX. Also, the locations of the SID update frames are not predefined and each update frame can be located anywhere in the frame structure. This way, control data can be transmitted quickly.

Since during DTX, the transmission means 124 can transmit information on the changes occurred in the radio path in a SID update frame on the basis of the measurement results obtained from the measuring means 115, the coding or decoding rate of the transceiver receiving the SID update frames can be altered quickly. The update frames can be transmitted 10 to 20 times a second, for instance, if a lot of changes occur in the conditions of the radio channel. On the basis of the information in the received SID frames, it is possible to change the radio channel used by the transceivers.

The solution of the invention aims at keeping the average transmission power of a transceiver in DTX mode relatively unchanged in spite of transmitting the update frames. The transceiver preferably uses one fixed SID frame to transmit measurement data during a measurement period, when the transceiver is in DTX mode. In GSM systems, for instance, the measurement period is 480 ms. During a measurement period, it is, however, also possible to transmit SID frames with non-fixed locations in addition to the fixed SID frames. The SID frames with non-fixed locations can be transmitted during DTX when required. The SID frames used for updating can be transmitted channel-coded, interleaved and in proportion to the frame structure like normal SID frames. This way, information is immediately obtained on whether the received SID frame contains for instance measurement or control data possibly suitable for changing the adaptation rate. Even though the invention has above been described by means of SID frames, any frames containing control and measurement data can be used instead of SID frames.

In a radio system of the invention, the number of extra frames can be limited to 20 second periods, for instance. The transmission of the frames is limited to minimize the generation of possible interference. Additionally, limiting the number of update frames makes it possible to maintain a relatively high benefit derived from DTX. In practice, this means that the discharging of the charge in a battery of a mobile phone can be slowed down by limiting the frames. The limiting can be implemented with the control means 120, for instance.

The control means 120 can use a counter, for instance, which is reset at 20 second intervals, for the limiting. The counter reading is increased by one, if an extra frame has been transmitted during DTX. When the counter reading exceeds 120, for instance, extra frames are no longer transmitted. The transmission of frames can only be continued after the counter has been reset to zero.

Even though the invention has been explained in the above with reference to examples in accordance with the accompanying drawings, it is obvious that the invention is not restricted to them but can be modified in many ways within the scope of the inventive idea disclosed in the attached claims.

What is claimed is:

1. A transmission method used during DTX in a radio system comprising a base transceiver station acting as a transceiver and subscriber terminals acting as transceivers which establish a connection with each other with a signal transmitted through the base transceiver station, for which connection a radio channel is formed, wherein a signal coded by the base transceiver station and subscriber terminal transceivers are transmitted, the method comprising:

measuring a signal received from a radio channel, transmitting to the radio channel during DTX, information in frames, wherein the information is based on the obtained measurement result, placing at least some of the frames freely anywhere in a frame structure to be transmitted, transmitting information in the frames to a transceiver which is connected to a transceiver in DTX mode, and altering the operation of the transceiver, which receives the above-mentioned frames, on the basis of the information in the frames.

2. The method as claimed in claim 1, wherein the frames transmitted during DTX are SID frames.

3. The method as claimed in claim 1, wherein the frames transmitted during DTX, of which at least some can be freely placed in the frame structure to be transmitted, contain control and measurement data.

4. The method as claimed in claim 1, wherein altering a coding rate of a speech coder of the transceiver on the basis of the information transmitted in the frame.

5. The method as claimed in claim 1, wherein altering a decoding rate of a speech coder of the transceiver on the basis of the information transmitted in the frame.

6. The method as claimed in claim 1, wherein if the measurement result obtained from measuring the radio channel differs sufficiently from a previous measurement result, information on the change occurred in the radio channel is transmitted in a frame which can be freely transmitted to the radio channel at any moment during DTX.

7. The method as claimed in claim 1, further comprises altering channel coding and channel decoding rate of the transceiver receiving the frames on the basis of the information transmitted in the received frames.

8. The method as claimed in claim 1, further comprises placing the frames transmitted during DTX in an SACCH frame structure so that at most one frame has a fixed location in the SACCH multiframe.

9. The method as claimed in claim 1, further comprises coding and decoding the signal establishing the connection with an AMR codec in the transceiver, the coding rate of which is altered on the basis of the information received by the transceiver.

10. The method as claimed in claim 1, further comprises coding and decoding the signal establishing the connection with an AMR codec in the transceiver, the decoding rate of which is altered on the basis of the information received by the transceiver.

11. A radio system which comprises a base transceiver station acting as a transceiver and subscriber terminals acting as transceivers which establish a connection with each other with a signal transmitted through the base transceiver station, for which connection a radio channel is formed, in which a signal coded by the transceiver is transmitted, and in which radio system the transceiver comprises transmission means which transmit frames when the transceiver is in DTX mode, the radio system comprising:

a measuring means which measure the signal received by the transceiver from the radio channel, a transmission means which transmits during DTX information in frames to the radio channel on the basis of a measurement result obtained from the measuring means, of which frames at least some are freely placed by the transmission means anywhere in the frame structure to be transmitted, after which the transmission means transmit the frames to the transceiver which is connected to a transceiver in DTX mode, and the transceiver receiving the frames alters its operation on the basis of the information in the frames.

12. The radio system as claimed in claim 11, wherein the frames transmitted by the transmission means are SID frames.

13. The radio system as claimed in claim 10, wherein the transceiver receiving the frames comprises a coder which alters the transceiver's coding rate on the basis of the information transmitted in the frames.

14. The radio system as claimed in claim 10, wherein the transceiver receiving the frames comprises a decoder which alters the transceiver's decoding rate on the basis of the information transmitted in the frames.

15. The radio system as claimed in claim 10, in that wherein the transmission means transmit frames freely at any time during DTX.

16. The radio system as claimed in claim 10, wherein the transmission means transmit frames, if the measurement result obtained from the measuring means differs sufficiently from a previous measurement result.

17. The radio system as claimed in claim 10, wherein the transmission means of the transceiver in DTX mode freely place the SID frames anywhere in the frame structure.

18. The radiosystem as claimed in claim 10, wherein the transceiver receiving the frames alters its the transceiver channel coding and channel decoding rate on the basis of the information in the frames.

19. The radio system as claimed in claim 10, wherein the transmission means places the frames transmitted during DTX in an SACCH frame structure so that at most one frame has a fixed location in a SACCH multiframe.

20. The radio system as claimed in claimed in 11, wherein the transceiver in DTX mode is a base transceiver station which transmits frames to a transceiver which is a subscriber terminal.

21. The radio system as claimed in claim 11, wherein the transceiver in DTX mode is a subscriber terminal which transmits frames to a transceiver which is a base transceiver station.

22. The radio system as claimed in claim 11, wherein the frames transmitted during DTX by the transmission means, of which frames at least some can be freely placed in the frame structure to be transmitted, are frames containing control data.

23. The radio system as claimed in claim 11, wherein the transceiver comprises a coder and a decoder implemented with an AMR codec which alters the coding rate on the basis of the information received by the transceiver.

24. The radio system as claimed in claim 11, wherein the frames transmitted during DTX by the transmission means, of which frames at least some can be freely placed in the frame structure to be transmitted, are frames containing measurement data.

25. The radio system as claimed in claim 11, wherein the transceiver comprises a coder and a decoder implemented with an AMR codec which alters the decoding rate on the basis of the information received by the transceiver.

* * * * *